United States Patent [19]

Yomogida

[11] 4,048,622
[45] Sept. 13, 1977

[54] PROGRAMMABLE SEQUENCE CONTROLLER

[75] Inventor: Toshihiko Yomogida, Kariya, Japan

[73] Assignee: Toyoda-Koki Kabushiki-Kaisha, Japan

[21] Appl. No.: 713,351

[22] Filed: Aug. 11, 1976

[30] Foreign Application Priority Data

Sept. 11, 1975 Japan .................... 50-110666

[51] Int. Cl.² .......................................... G05B 11/32
[52] U.S. Cl. ................................................. 364/900
[58] Field of Search .................................. 340/172.5

[56] References Cited

U.S. PATENT DOCUMENTS 3,832,696  8/1974  Nakao et al. .................. 340/172.5
3,996,565  12/1976 Nakao et al. .................. 340/172.5

*Primary Examiner*—Eugene G. Botz
*Attorney, Agent, or Firm*—Oblon, Fisher, Spivak, McClelland & Maier

[57] ABSTRACT

In a programmable sequence controller, a logic operation circuit has first and second AND gates, first and second OR gates and first to fourth flip flops. An input is applied to the two AND gates and the two OR gates. The first and second AND gates receive outputs of the first and second flip flops wich receive outputs of the first and second AND gates and are triggered in response to first and second control commands, respectively. The first and second OR gates receive outputs of the third and fourth flip flops which receive outputs of the first and second OR gates and are triggered in response to third and fourth control commands, respectively. A sequence control is performed in response to the outputs of the first to fourth flip flops.

7 Claims, 9 Drawing Figures

PROGRAMMABLE SEQUENCE CONTROLLER

BACKGROUND OF THE INVENTION

1. Field of the Invention

The present invention relates to a programmable sequence controller capable of performing a desired sequence control by applying into a memory device a program which is made in accordance with a sequence circuit.

2. Description of the Prior Art

In a conventional programmable sequence controller, an output signal of an input contact is compared with a control command for examining whether the input contact satisfies a control condition. Such a comparison is performed as briefly shown in FIG. 1. The output signal of the input contact is compared with a control command TON by an AND gate GA1 for examining whether the input contact is in an ON state. When the input contact is in the ON state, the AND gate GA1 generates a ONE signal. An inverted signal generated from an inverter IN1, which inverts the output signal of the input contact, is compared with a control command TOP by an AND gate GA2 for examining whether the input contact is in an OFF state. When the input contact is in the OFF state, the AND gate GA2 generates a ONE signal. When one of the AND gates GA1 and GA2 generates a ONE signal, a flip flop is set so that a satisfaction or unsatisfaction of an OR logic circuit can be examined.

In a sequence control circuit, there is usually provided an AND logic circuit as well as an OR logic circuit. In order to examine a satisfaction or unsatisfaction of the AND logic circuit in the conventional programmable sequence controller, the AND logic function must be converted into an OR logic function by using DeMorgan's theorem. For example, assuming that a relay CR3 is to be energized if input contacts CR1 and CR2 are both in an ON state, this relationship may be expressed in Boolean form as follows:

$$CR3 = CR1 \cdot CR2 \quad (1)$$

By use of DeMorgan's theorem, the expression (1) can be converted to the following expression:

$$\overline{CR3} = \overline{CR1} + \overline{CR2} \quad (2)$$

As can be understood from the expression (2), the control command TOF must be used in order to examine whether or not the input contacts CR1 and CR2 are in the ON state. Furthermore, the flip flop has to be set when examination of the input contacts CR1 and CR2 by the control command TOF are unsatisfied. For this reason, preparation of the program is troublesome and there is a possibility that the control commands TON and TOF will be misused. This troublesome programming is caused by the fact that only two control commands are provided for examining both the AND and OR logic functions, and that only one flip flop is provided to identify satisfaction or unsatisfaction of the examination for the AND and OR logic functions.

SUMMARY OF THE INVENTION

It is therefore an object of the present invention to provide a new and improved programmable sequence controller which enables a sequence program to be easily prepared.

Another object of the present invention is to provide a new and improved programmable sequence controller capable of performing a sequence control without comparing an output signal of an input contact with a control command.

Another object of the present invention is to provide a new and improved programmable sequence controller comprising four flip flops which are adapted to be triggered in response to four kinds of control commands in order to perform a sequence control.

Briefly, in accordance with this invention the foregoing and other objects are attained by the provision of a programmable sequence controller which has memory means for memorizing a sequence program including a train of instructions identified respectively by memory addresses thereof. Each of the instructions have command information and address information therein, the command information being selected from a group of control commands which include a first control command for examining whether an input is in an ON state under the condition of being ANDed with another input, a second control command for examining whether an input is in an OFF state under the condition of being ANDed with another input, a third control command for examining whether an input is in an ON state under the condition of being ORed with another input, and a fourth control command for examining whether an input is in an OFF state under the condition of being ORed with another input. An input circuit is operatively connected to a plurality of addressed external input devices for converting states of the external input devices into logical values and an output circuit is operatively connected to a plurality of addressed external output devices to be energized or deenergized. A logic operation circuit is operatively connected to the memory means and the input and output circuits and means are provided for reading out and feeding the train of instructions from the memory means to the logic operation circuit. The logic operation circuit includes a line connected to receive a logical value of one of the external input devices specified by the address information, a first AND gate, a first flip flop connected to receive an output of the first AND gate and triggered when the first control command is applied. The first AND gate is connected to the line and to receive an output of the first flip flop. A second AND gate is provided and a second flip flop is connected to receive an output of the second AND gate and is triggered when the second control command is applied. The second AND gate is connected to the line and to receive an output of the second flip flop. A first OR gate is provided and a third flip flop is connected to receive an output of the first OR gate and is triggered when the third control command is applied. The first OR gate is connected to the line and to receive an output of the third flip flop. A second OR gate is provided and a fourth flip flop is connected to receive an output of the second OR gate and is triggered when the fourth control command is applied. The second OR gate is connected to the line and to receive an output of the fourth flip flop. The first to fourth flip flops are set when they are triggered and receive a ONE signal and the output circuit is operable to energize or deenergize one of the addressed external output devices in response to the outputs of the first to fourth flip flops.

BRIEF DESCRIPTION OF THE DRAWINGS

The foregoing and other objects of the present invention will be more fully appreciated as the same becomes better understood from the following detailed description of the preferred embodiments of the present invention, when considered in connection with the accompanying drawings, in which like reference numerals designate like or corresponding parts and wherein.

DETAILED DESCRIPTION OF THE PREFERRED EMBODIMENTS

Figure 2:
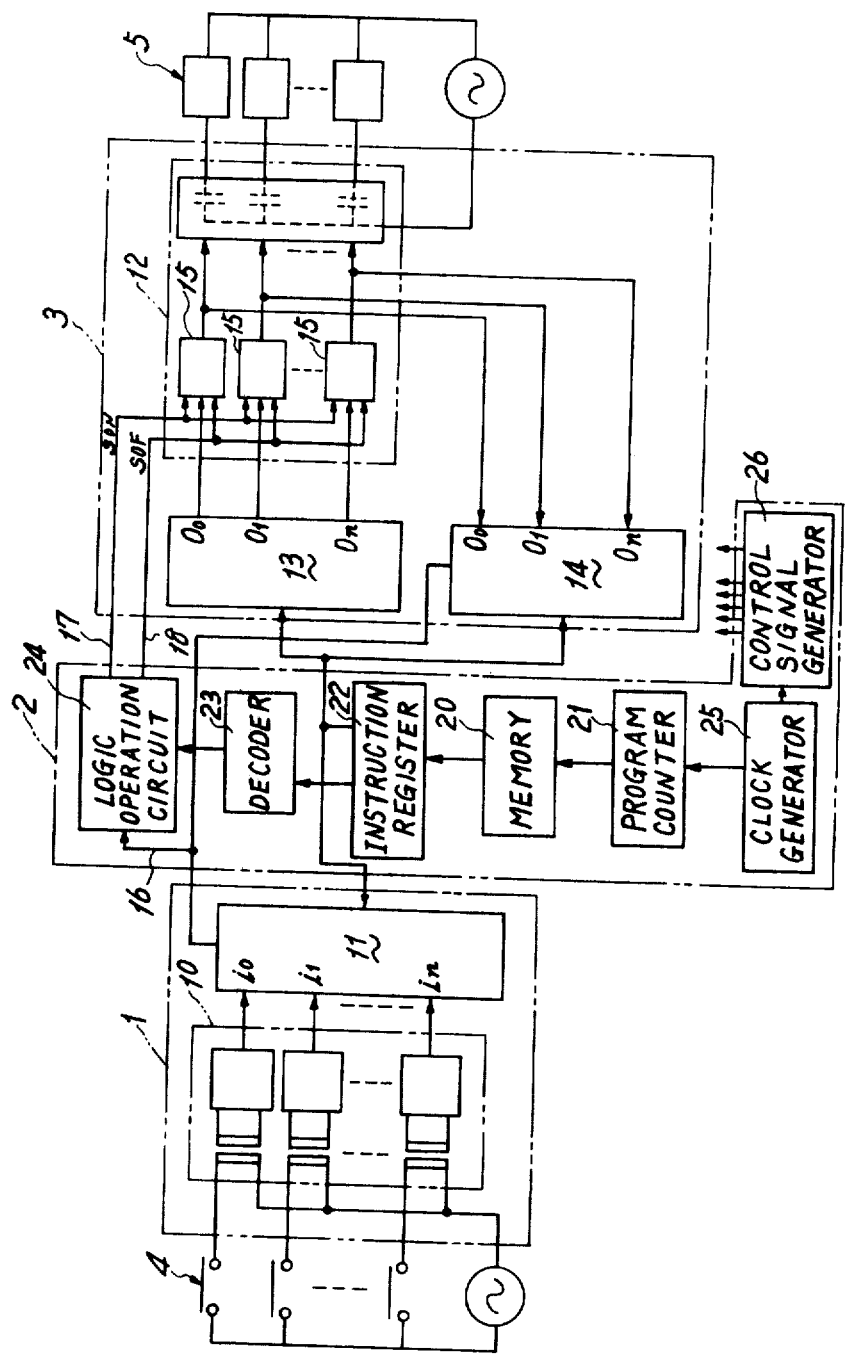
FIG. 2 is a block diagram showing an outline of a programmable sequence controller according to the present invention.

Referring to FIG. 2, a programmable sequence controller according to the present invention comprises an input circuit 1, a logic control 2 and an output circuit 3. The input circuit 1 is connected to a plurality of addressed external input contacts 4 for receiving the logical conditions thereof (e.g., ON or OFF). The input circuit 1 comprises an input converting circuit 10 for converting each condition of the input contacts 4 into a logical status (e.g., ONE or ZERO) to be used as an input signal and an input changing circuit 11 for selecting one of the input signals converted by the input converting circuit 10. The output circuit 3 is connected to a plurality of addressed external output devices 5 such as relays or solenoids. The output circuit 3 comprises an output converting and holding circuit 12 for controlling energization and deenergization of the output devices 5 and for holding the status thereof by a plurality of flip flops 15 provided therein, a selecting circuit 13 for selecting one of the flip flops 15 and applying a trigger signal thereto, and an output changing circuit 14 for selecting one of the flip flops 15 and applying the status thereof to a line 16 to be used as an input signal.

The logic control 2 comprises a memory device 20 for memorizing a sequence program, a program counter 21 for designating an address of the memory device 20, an instruction register 22 for memorizing a program read out from the memory device 20, a decoder 23 for distinguishing a command provided in the program, and a logic operation circuit 24 for receiving an input signal selected by one of the input changing circuits 11 and the output changing circuit 14 to examine the status thereof and for memorizing the examined result. A program or instruction provided on a word by word basis and memorized in the register 22 comprises a command information applied to the decoder 23 and an address information applied to one of the input changing circuits 11, the selecting circuit 13 and the output changing circuit 14 to identify one of the input contacts 4 and the output devices 5. When an address number selected by an address information is assigned to the input changing circuit 11, a logical status ONE or ZERO of one of the input contacts 4 identified by the address number is applied to the logic operation circuit 24 through the line 16. When an address number selected by an address information is assigned to the output changing circuit 14, a logical status of one of the flip flops 15 identified by the address number is applied to the logic operation circuit 24 through the line 16. Simultaneously therewith, a trigger signal is applied from the selecting circuit 13 to the identified flip flop 15 to set or reset the same when a set signal SON or a reset signal SOF is also applied thereto from the logic operation circuit 24 through a line 17 or 18. When one of the signals SON and SOF is applied to the flip flop 15, an input signal thereof applied to the line 16 through the output changing circuit 14 is rendered inoperative. The input signal is rendered operative only when there is no set or reset signals SON and SOF.

Figure 1:
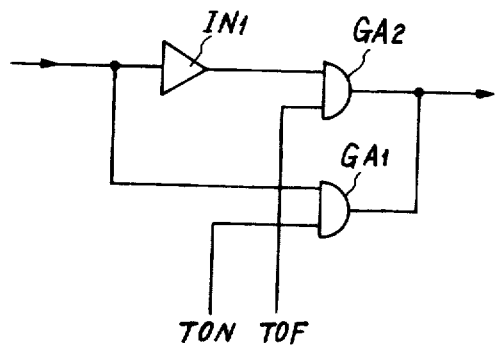
FIG. 1 is a circuit diagram used in a conventional programmable sequence controller.
Figure 3:
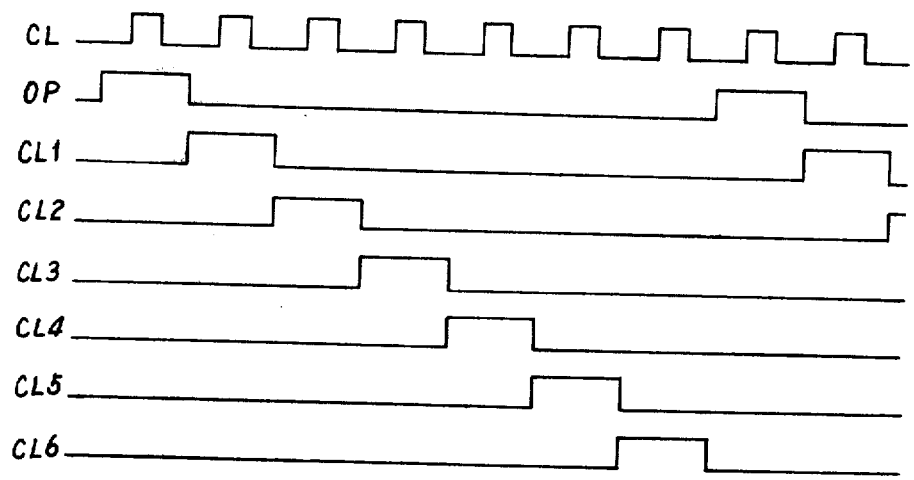
FIG. 3 shows a time chart of various timing signals.

Reference numeral 25 designates a clock generating circuit for generating a train of clock pulses which are applied to the program counter 21 to increase the content thereof one by one. A control signal generating circuit 26 also receives the clock pulses to produce various kinds of control signals for control of the logical operation, and timing pulses CL1 to CL6, as shown in FIG. 3, for controlling one program executing cycle. A program or instruction is read out from the memory device 20 during the generation of the timing pulses CL1 to CL3. At the generation of the timing pulse CL3, the read out program is preset into the instruction register 22. A command information of the program is fed to the decoder 23 to be decoded thereby and an address information of the program is fed to one of the input circuits 1 and the output circuit 3, whereby a logical operation is executed.

Figure 4:
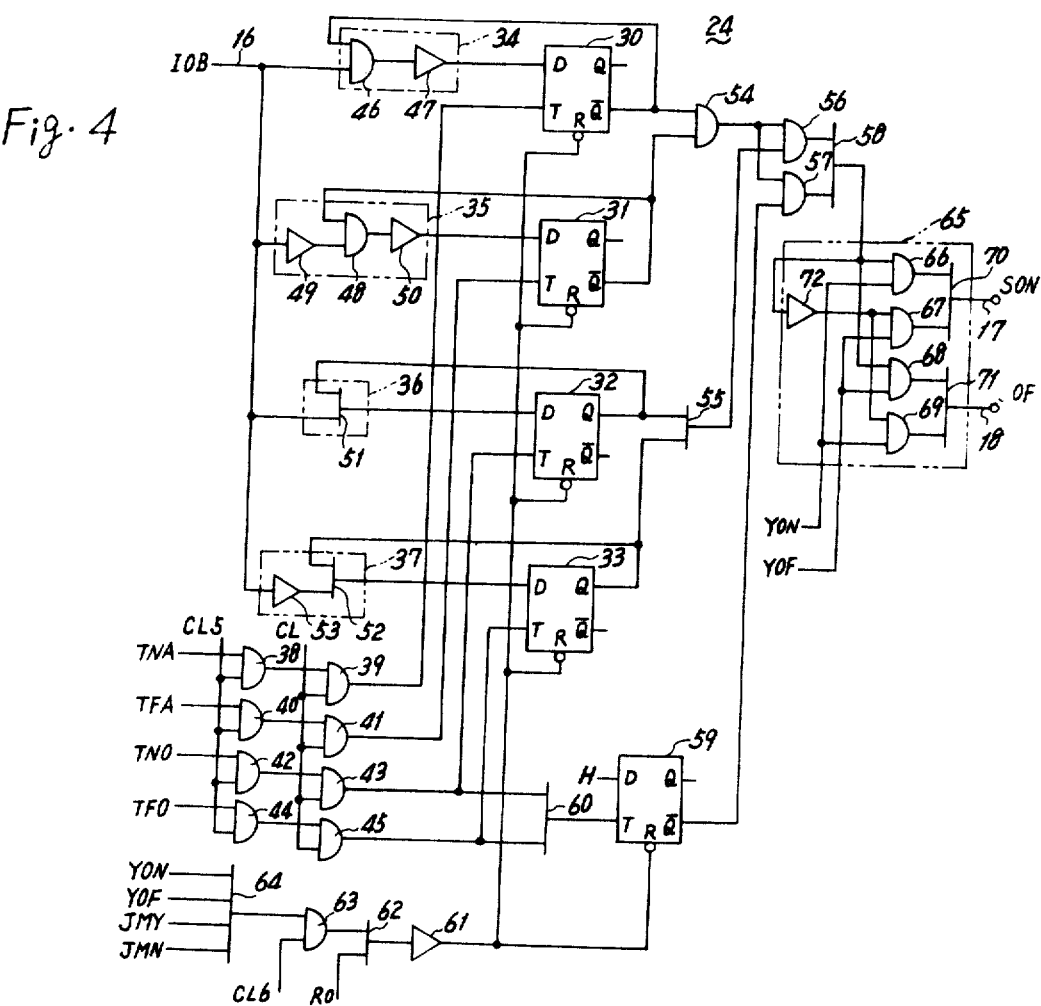
FIG. 4 is a circuit diagram showing a logic operation circuit according to the present invention.

Referring now to FIG. 4, the logic operation circuit 24 comprises four D-type flip flops 30, 31, 32 and 33 which are connected at the respective D terminals to the line 16 through AND logic operation circuits 34, 35 and OR logic operation circuits 36, 37, respectively.

The flip flop 30 is connected at the T terminal thereof to receive through AND gates 38 and 39 a control command TNA for examining whether an input is in the ON state under the condition of being ANDed with another input. The flip flop 31 is connected at the T terminal thereof to receive through AND gates 40 and 41 a control command TFA for examining whether an input is in the OFF state under the condition of being ANDed with another input. The T terminal of the flip flop 32 is connected to receive through AND gates 42 and 43 a control command TNO for examining whether an input is in the ON state under the condition of being ORed with another input. The T terminal of the flip flop 33 is connected to receive through AND gates 44 and 45 a control command TFO for examining whether an input is in the OFF state under the condition of being ORed with another input.

The AND logic operation circuit 34 comprises an AND gate 46 and an inverter 47 connected in series therewith. One input terminal of the AND gate 46 is connected to the reset output terminal $\overline{Q}$ of the flip flop 30 and the other input terminal of the AND gate 46 is connected to the line 16 to receive an input signal therefrom. Accordingly, the input signal is ANDed with the content memorized at the reset output terminal of the flip flop 30, and the inverted ANDed result is memorized in the flip flop 30 when the control command TNA is applied to generate a trigger signal at the T terminal of the flip flop 30. The AND logic operation circuit 35 comprises an AND gate 48 and inverters 49 and 50. The AND gate 48 is connected at one input terminal thereof to the reset output terminal $\bar{Q}$ of the flip flop 31 and at the other input terminal thereof to the line 16 through the inverter 49. Accordingly, a reversed signal of the input signal on the line 16 is ANDed with the content memorized at the reset output terminal of the flip flop 31, and the inverted ANDed result is memorized in the flip flop 31 when the control command TFA is applied to generate a trigger signal at the T terminal of the flip flop 31.

The OR logic operation circuit 36 comprises an OR gate 51 which is connected at one input terminal thereof to the set output terminal Q of the flip flop 32 and at the other input terminal thereof to the line 16. The input signal on the line 16 is thus ORed with the content memorized at the set output terminal of the flip flop 32, and the ORed result is memorized in the flip flop 32 when the control command TNO is applied to apply a trigger signal to the T terminal of the flip flop 32. The OR logic operation circuit 37 comprises an OR gate 52 and an inverter 53. The OR gate 52 is connected at one input terminal thereof to the set output terminal Q of the flip flop 33 and at the other input terminal thereof to the line 16 through the inverter 53. A reversed signal of the input signal on the line 16 is accordingly ORed with the content memorized at the set output terminal of the flip flop 33 and the ORed result is memorized in the flip flop 33 when the control command TFO is applied to apply a trigger signal at the T terminal of the flip flop 33.

An AND gate 54 is connected at its one input terminal to the reset output terminal $\bar{Q}$ of the flip flop 30 and at its other input terminal to the reset output terminal Q of the flip flop 31. An OR gate 55 is connected at its input terminals to the set output terminals Q of the flip flops 32 and 33. An AND gate 56 is connected at the input terminals thereof to the output terminals of the AND gate 54 and the OR gate 55. The output terminal of the AND gate 56 is connected to an input terminal of an OR gate 58. When neither of the control command TNA nor the control command TFA is applied, the flip flops 30 and 31 are both maintained reset so that the output of the AND gate 54 is maintained ONE. Accordingly, in such a situation, the AND gate 56 generates an output depending upon the OR logic operations. An AND gate 57 is connected at the input terminals thereof to the output terminal of the AND gate 54 and to a reset output terminal $\bar{Q}$ of a D-type flip flop 59 which is set only when no OR logic operation is performed. The output terminal of the AND gate 57 is connected to the input terminal of the OR gate 58. Accordingly, the OR gate 58 can generate an output in accordance with only AND logic operations. The flip flop 59 is connected at the T terminal thereof to an output terminal of an OR gate 60 which is connected at the input terminals thereof to the output terminals of the AND gates 43 and 45. The D terminal of the flip flop 59 is adapted always to receive a ONE signal. Accordingly, when one of the control commands TNO and TFO is applied, the flip flop 59 is set to generate a ZERO output from its reset terminal to block the AND gate 57, whereby no output is generated depending upon only the AND logic operations.

The reset terminals R of the flip flops 30, 31, 32, 33 and 59 are commonly connected through an inverter 61 to an output terminal of an OR gate 62. The OR gate 62 is connected at one input terminal thereof to an output terminal of an AND gate 63. The other input terminal of the OR gate 62 is connected to receive a reset signal Ro. The AND gate 63 is connected at one input terminal to an output terminal of an OR gate 64. The other input terminal of the AND gate 63 is connected to receive the timing pulse CL6. Four input terminals of the OR gate 64 are respectively connected to receive output commands YON, YOF and jump commands JMY, JMN. When one of commands YON, YOF, JMY and JMN is applied, the flip flops 30, 31, 32, 33 and 59 are all reset at the time that the timing pulse CL6 is generated.

The input terminals of the AND gates 38, 40, 42 and 44 are commonly connected to receive the timing pulses CL5. The input terminals of the AND gates 39, 41, 43 and 45 are commonly connected to receive the clock pulse CL. Accordingly, the flip flops 30, 31, 32 and 33 are triggered only at the time when both the clock pulse CL and the timing pulse CL5 is generated.

The output terminal of the OR gate 58 is connected to an identification circuit 65 which generates an output signal SON on line 17 or SOF on line 18 in accordance with the logic AND and OR operations.

The identifying circuit 65 comprises four AND gates 66, 67, 68 and 69, two OR gates 70 and 71 and an inverter 72. The output terminal of the OR gate 58 is connected to the input terminals of the AND gates 66 and 68 and the inverter 72. The output terminal of the inverter 72 is connected to the input terminals of the AND gates 67 and 69. The other input terminals of the AND gates 66 and 69 are connected to receive the output command YON. The other input terminals of the AND gates 67 and 68 are connected to receive the output command YOF. The OR gate 70 is connected at the input terminals thereof to the output terminals of the AND gates 66 and 67 to generate the output signal SON on line 17. The OR gate 71 is connected at the input terminals thereof to the output terminals of the AND gates 68 and 69 to generate the output signal SOF on line 18.

Figure 5:
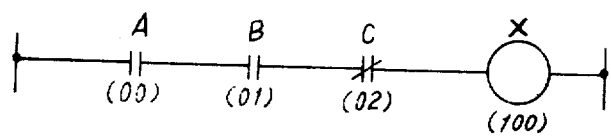
FIGS. 5, 6 and 7 are circuit diagrams showing exemplified models of the contacts and connections of electrical ladder circuits.

The logic operation will now be described. A sequence circuit shown in FIG. 5 is a simple logic AND circuit. Input contacts shown in FIG. 5 are respectively connected to the 00, 01 and 02 addresses of the input circuit 1. A relay coil X, as an output element, is connected to the 100 address of the output circuit 3. The program for this sequence circuit is shown in TABLE 1.

TABLE 1

| Memory Address | Command | Connected Address |
|---|---|---|
| n | TNA | 00(A) |
| n+1 | TNA | 01(B) |
| n+2 | TFA | 02(C) |
| n+3 | YON | 100(X) |

These programs or instructions are memorized in the memory device 20. In the course of execution of the program, when the address n is designated by the program counter 21, the command TNA 00 is read out and preset in the instruction register 22. The address information 00 is applied to the input changing circuit 11 to select the input contact A connected to the 00 address. The signal generated from the contact A is applied to the AND logic operation circuit 34 through the line 16.

If the input contact A is in the ON state, the AND gate 46 of the AND logic operation circuit 34 receives two ONE input signals at the input terminals thereof to thereby generate a ONE output signal from the output terminal thereof. The ONE signal from the AND gate 46 is inverted by the inverter 47 into a ZERO signal which is applied to the D terminal of the flip flop 30. The command information TNA is applied to the decoder 23 to be decoded thereby so that a ONE signal is applied to the AND gate 38. Accordingly, a trigger signal is applied to the flip flop 30 at the time of generation of the timing pulse CL5 and the clock pulse CL. However, since a ZERO signal is applied to the D terminal of the flip flop 30, the flip flop 30 is maintained reset, regardless of the receiving of the trigger signal. Therefore, the flip flop 30 memorizes that the input contact A is in the ON state.

If the input contact A is in the OFF state, the flip flop 30 is set upon receipt of the trigger signal to thereby memorize that the contact A is in the OFF state.

The content of the program counter 21 is increased at the time of generation of the timing pulse CL5 to designate the memory address $n+1$. Therefore, the next program TNA 01 is read out from the memory device 20 and preset in the instruction register 22. The address information 01 selects the input contact B whose logical status is ANDed with the content of the flip flop 30 by the AND logic operation circuit 34. When the flip flop 30 has been reset and the contact B is in the ON state, a ZERO signal is applied to the D terminal of the flip flop 30. On the other hand, when the flip flop 30 has been reset and the contact B is in the OFF state, a ONE signal is applied to the D terminal of the flip flop 30. At the time of generation of the timing pulse Cl5 and the clock pulse CL, the flip flop 30 is triggered to memorize the result of the logical AND operation between the contacts A and B.

When the memory address $n+2$ is subsequently designated, the program TFA 02 is read out so that a logical status of the input contact C is examined by the AND logic operation circuit 35. Since the flip flop 31 has been reset, the D terminal of the flip flop 31 receives a ZERO signal if the contact C is in the OFF state, while a ONE signal if the contact C is in the ON state. At the time of generation of the timing pulse CL5 and the clock pulse CL, the flip flop 31 is triggered to memorize the result of the logical AND operation.

When the input contacts A and B are in the ON state and the input contact C is in the OFF state, the flip flops 30 and 31 are in the reset state so that the AND gate 54 generates a ONE signal. The flip flop 59 is maintained reset, since no trigger signal is applied to the flip flop 59. Accordingly, the AND gate 57 generates a ONE signal which is applied to the identifying circuit 65 through the OR gate 58. When the memory address $n+3$ is designated, the program YON 100 is read out, whereby the output command YON is decoded to apply a ONE signal to the AND gates 66 and 69. In accordance therewith, the AND gate 66 generates a ONE signal, so that the output signal SON is generated on line 17. The address information 100 is applied to the selecting circuit 13 so as to apply a trigger signal to the flip flop 15 corresponding to the output element X to set the same. Simultaneously with the setting of the flip flop 15, the output element X is energized. Subsequently, the AND gate 63 generates a ONE signal at the time of generation of the timing pulse CL6 so that the flip flops 30 to 33 and 59 are reset.

When one of the input contacts A and B is in the OFF state, the AND gate 54 generates a ZERO signal, whereby a ZERO signal is applied to the identifying circuit 65. Therefore, when the output command YON is applied, the output signal SOF is generated on line 18 so that the output element X is deenergized.

Figure 6:
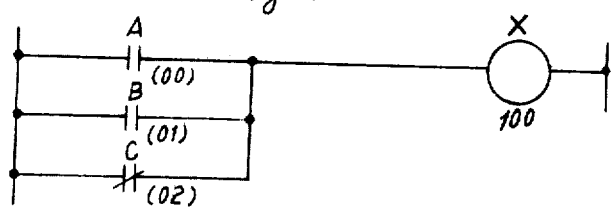

A program for a simple logic OR circuit shown in FIG. 6 is shown in TABLE 2.

TABLE 2

| Memory Address | Command | Connected Address |
| --- | --- | --- |
| n | TNO | 00(A) |
| n+1 | TNO | 01(B) |
| n+2 | TFO | 02(C) |
| n+3 | YON | 100(X) |

When the program TNO 00 at $n$ memory address is read out, a logical status of the input contact A is ORed with the content of the flip flop 32 by the OR logic operation circuit 36. The examined result is memorized in the flip flop 32 when triggered at the time of the timing pulse CL5 and the clock pulse CL. If the contact A is in the ON state under the condition of the flip flop 32 being reset, the D terminal receives a ONE signal. On the other hand, if the contact A is in the OFF state under the condition of the flip flop 32 being reset, the D terminal of the flip flop 32 receives a ZERO signal. Accordingly, when the flip flop 32 is set upon receipt of a trigger signal, the flip flop 32 memorizes that the contact A is in the ON state. When the flip flop 32 is maintained reset regardless of the receiving of a trigger signal, the flip flop 32 memorizes that the contact A is in the OFF state.

When the program TNO 01 at $n+1$ memory address is read out, a logical status of the input contact B is examined in the same manner as mentioned above. When the program TFO 02 at $n+2$ memory address is read out, a logical status of the input contact C is examined by the OR logic operation circuit 37 and the result thereof is memorized in the flip flop 33.

When one of the input contacts A and B is in the ON state, or the input contact C is in the OFF state, one of the flip flops 32 and 33 is set so that a ONE signal is applied to the AND gate 56 through the OR gate 55. Under these conditions, the flip flop 59 is set and the AND gate 57 receives a ZERO signal therefrom. The AND gate 54 generates a ONE signal, since the flip flops 30 and 31 are maintained reset. Accordingly, the AND gate 56 generates a ONE signal which is applied to the identifying circuit 65 through the OR gate 58. When the program YON 100 at $n+3$ memory address is read out, the output signal SON is generated on line 17, whereby the output element X is energized.

When the contacts A and B are both in the OFF state and the contact C is in the ON state, the flip flops 32 and 33 are maintained reset so that a ZERO signal is applied to the identifying circuit 65. Accordingly the output signal SOF is generated on line 18, whereby the output element X is deenergized.

Figure 7:
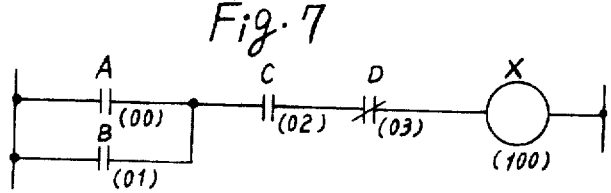

A program for a sequence circuit shown in FIG. 7 is shown in TABLE 3.

TABLE 3

| Memory Address | Command | Connected Address |
| --- | --- | --- |
| n | TNO | 00(A) |
| n+1 | TNO | 01(B) |
| n+2 | TNA | 02(C) |
| n+3 | TFA | 03(D) |
| n+4 | YON | 100(X) |

When the above described programs or instructions are executed, the examination results of the input contacts A and B are memorized in the flip flop 32 and the examination results of the input contacts C and D are respectively memorized in the flip flops 30 and 31. When the control command TNO is applied, the flip flop 59 is set so that the AND gate 57 receives a ZERO signal from the flip flop 59. Accordingly, the examination results of a logical OR operation of input contacts A and B and the examination result of a logical AND operation of input contacts C and D are ANDed by the AND gate 56. If the AND gate 56 generates a ONE signal, the output element X is energized, when the output command YON is applied. If the AND gate 56 generates a ZERO signal, the output element X is deenergized.

Figure 8:
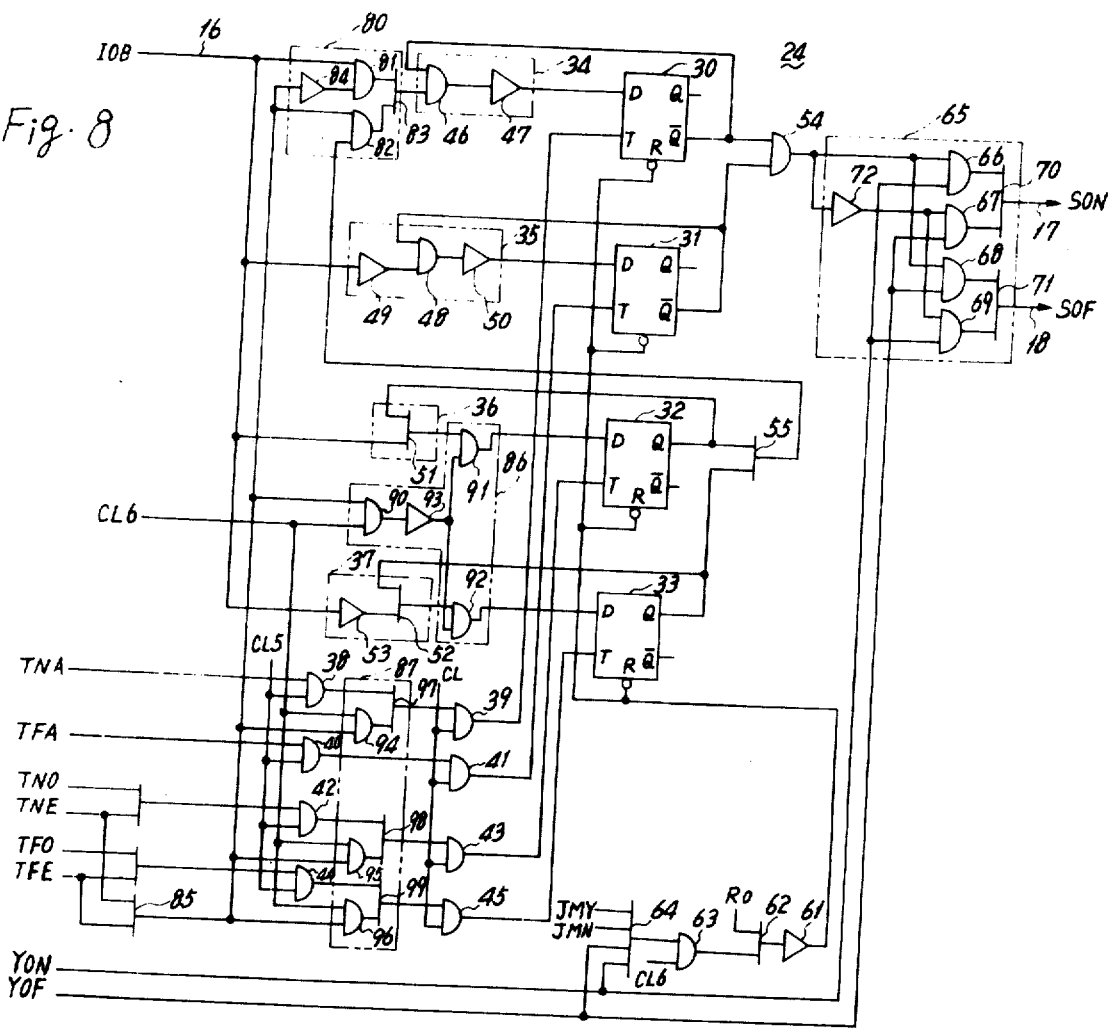
FIG. 8 is another embodiment of a logic operation circuit according to the present invention.

Another embodiment of the present invention will now be described with reference to FIG. 8. In this embodiment, the examination result of the logical OR operation is logically transferred to the flip flop 30, so that only the AND gate 54 controls all of the logic operations. Since the circuit shown in FIG. 8 is almost the same as that shown in FIG. 4, only the difference therebetween will be substantially described.

There is provided between the line 16 and the AND logic operation circuit 34 a logic transfer circuit 80 which comprises AND gates 81 and 82, an OR gate 83 and an inverter 84. The inverter 84 is connected at its input terminal to an output terminal of an OR gate 85 which is connected to receive logic transfer commands TNE and TFE. The AND gate 81 is connected at the input terminals thereof to the line 16 and the output terminal of the inverter 84. The AND gate 82 is connected at the input terminals thereof to the output terminals of the OR gates 55 and 85. The OR gate 83 is connected at the input terminals thereof to the output terminals of the AND gates 81 and 82 and the output terminal thereof is connected to the input terminal of the AND gate 46. Accordingly, if none of the logic transfer commands TNE and TFE is applied, the AND gate 82 receives a ZERO signal, whereby the AND logic operation circuit 34 generates a signal depending upon a signal appearing on the line 16 which is fed to the AND gate 46 through the AND gate 81 and the OR gate 83. On the other hand, when one of the commands TNE and TFE is applied, the AND gate 81 receives a ZERO signal through the inverter 84, whereby the AND logic operation circuit 34 generates a signal depending upon an output signal of the OR gate 55 which is fed to the AND gate 46 through the AND gate 82 and the OR gate 83.

A circuit 86 for applying a reset control signal is provided between the OR logic operation circuits 36, 37 and the flip flops 32, 33. The circuit 86 comprises AND gates 90, 91 and 92 and an inverter 93. The AND gate 90 is connected at the input terminals thereof to the output terminal of the OR gate 85 and to receive the timing pulse CL6. The output terminal of the AND gate 90 is connected to the input terminal of the inverter 93. The AND gate 91 is connected at the input terminals thereof to the output terminals of the OR gate 51 and the inverter 93 and the output terminal thereof is connected to the D terminal of the flip flop 32. The AND gate 92 is connected at the input terminals thereof to the output terminals of the OR gate 52 and the inverter 93 and the output terminal thereof is connected to the D terminal of the flip flop 33.

There is provided a circuit 87 for applying a trigger signal in a logic transferring operation which comprises AND gates 94, 95 and 96 and OR gates 97, 98 and 99. The AND gate 94 is connected at the input terminals thereof to the output terminal of the OR gate 85 and to receive the timing pulse CL6. The OR gate 97 is connected at the input terminals thereof to the output terminals of the AND gates 94 and 38 and the output terminal thereof is connected to an input terminal of the AND gate 39. The AND gate 95 is connected at the input terminals thereof to the output terminal of the OR gate 85 and to receive the timing pulse CL6. The OR gate 98 is connected at the input terminals thereof to the output terminals of the AND gates 95 and 42 and the output terminal thereof is connected to an input terminal of the AND gate 43. The AND gate 96 is connected at the input terminals thereof to the output terminal of the OR gate 85 and to receive the timing pulse CL6. The OR gate 99 is connected at the input terminals thereof to the output terminals of the AND gates 96 and 44 and the output terminal thereof is connected to the input terminal of the AND gate 45.

When none of the logic transfer commands TNE and TFE is applied, the AND gate 90 receives a ZERO signal so that the same generates a ZERO signal which is inverted into a ONE signal by the inverter 93. Accordingly, the flip flops 32 and 33 receive at the D terminals thereof signals depending upon the outputs of the OR logic operation circuits 36 and 37, respectively. When one of the logic transfer commands TNE and TFE is applied, the AND gate 90 receives a ONE signal from the OR gate 85. The AND gate 90 generates at the time of generation of the timing pulse CL6 a ONE signal which is inverted into a ZERO signal by the inverter 93. Accordingly, the flip flops 32 and 33 receive ZERO signals at the D terminals thereof. Furthermore, the AND gates 94, 95 and 96 generate ONE signals at the time of generation of the timing pulse CL6 so that the flip flops 30, 32 and 33 are triggered. Thus, the flip flop 30 memorizes the ANDed result between the content previously memorized in the flip flop 30 and the output of the OR gate 55, and the flip flops 32 and 33 are reset. In addition to the above mentioned logic transferring operation, application of the command TNE or TFE operates similar to the application of the command TNO or TFO. That is, when one of the commands TNE and TFE is applied, the result of a logic OR operation between a signal appearing on line 16 and the content memorized in the flip flop 32 or 33 is memorized in the flip flop 32 or 33 at the time of generation of the timing pulse CL5 and the clock pulse CL and thereafter the logic transferring operation is performed at the time of generation of the timing pulse CL6.

Figure 9:
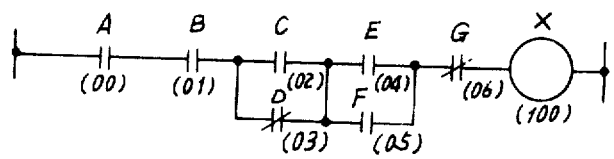
FIG. 9 is a relay circuit diagram suitable to be controlled by the logic operation circuit shown in FIG. 8.

The operation of the above described logic operation circuit will now be described. A program for a sequence circuit shown in FIG. 9 is shown in TABLE 4.

TABLE 4

| Memory Address | Command | Connected Address |
|---|---|---|
| n | TNA | 00(A) |
| n+1 | TNA | 01(B) |
| n+2 | TNO | 02(C) |
| n+3 | TFE | 03(D) |
| n+4 | TNO | 04(E) |
| n+5 | TNE | 05(F) |
| n+6 | TFA | 06(G) |
| n+7 | YON | 100(X) |

In the course of execution of the above programs, the examination results of the input contacts A and B are memorized in the flip flop 30. When the program TNO 02 at the n+2 address is read out, the input contact C is examined and the result thereof is memorized in the flip flop 32. When the program TFE 03 at the n+3 address is read out, the logic transfer command TFE operates similar to the control command TFO until the timing pulse CL6 is generated. Accordingly, the examination result of the input contact D is memorized in the flip flop 33. The output of the OR gate 55 receiving the outputs of the flip flops 32 and 33 is fed through the logic transfer circuit 80 to the AND gate 46 to be ANDed with the content of the flip flop 30. The ANDed result is applied through the inverter 47 to the D terminal of the flip flop 30. Under these conditions, when the timing pulse CL6 is generated, the flip flops 30, 32 and 33 are triggered so that the flip flop 30 memorizes the operation results of the input contacts A, B, C and D, and the flip flops 32 and 33 are reset.

When the program TNO 04 at the $n+4$ address is read out, the input contact E is examined and the result thereof is memorized in the flip flop 32. Subsequently, when the program TNE 05 at the $n+5$ address is read out, the examination result of a logic OR operation between the input contacts E and F is memorized in the flip flop 32. The output of the flip flop 32 is fed through the logic transfer circuit 80 to the input terminal of the AND gate 46 to be ANDed with the content of the flip flop 30. Therefore, the examination result of the input contact A, B, C, D E and F is memorized in the flip flop 30. When the program TFA 06 at the $n+6$ address is read out, the input contact G is examined and the result thereof is memorized in the flip flop 31. The outputs of the flip flops 30 and 31 are ANDed by the AND gate 54. The ANDed result of the AND gate 54 is applied to the identifying circuit 65.

Subsequently, the program YON 100 at the $n+7$ address is read out. When the AND gate 54 generates a ONE signal, the output signal SON is generated on line 17 to energize the output element X. On the other hand, when the AND gate 54 generates a ZERO signal, the output signal SOF is generated on line 18 to deenergize the output element X.

As above described, it should now be apparent that the provision of the logic transfer circuit 80 causes simple logic operations and easier programming than heretofore possible.

Obviously, numerous modifications and variations of the present invention are possible in light of the above teachings. It is therefore to be understood that within the scope of the teachings herein and the appended claims, the invention may be practiced otherwise than as specifically described herein.

What is claimed as new and desired to be secured by Letters Patent of the United States is:

1. A programmable sequence controller comprising: memory means for memorizing a sequence program comprising a train of instructions identified respectively by memory addresses thereof, each of said instructions having command information and address information therein, said command information being selected from a group of control commands including a first control command for examining whether an input is in an ON state under the condition of being ANDed with another input, a second control command for examining whether an input is in an OFF state under the condition of being ANDed with another input, a third control command for examining whether an input is in an ON state under the condition of being ORed with another input, and a fourth control command for examining whether an input is in an OFF state under the condition of being ORed with another input, an input circuit operatively connected to a plurality of addressed external input devices for converting states of said external input devices into logical values;
an output circuit operatively connected to a plurality of addressed external output devices to be energized or deenergized;
a logic operation circuit operatively connected to said memory means and to said input and output circuits;
means for reading out and feeding said train of instructions from said memory means to said logic operation circuit;
said logic operation circuit comprising:
a line connected to receive a logical value of one of said external input devices specified by the address information;
a first AND gate;
a first flip flop connected to receive an output of said first AND gate and triggered when said first control command is applied;
said first AND gate being connected to said line and to receive an output of said first flip flop;
a second AND gate;
a second flip flop connected to receive an output of said second AND gate and triggered when said second control command is applied;
said second AND gate being connected to said line and to receive an output of said second flip flop;
a first OR gate;
a third flip flop connected to receive an output of said first OR gate and triggered when said third control command is applied;
said first OR gate being connected to said line and to receive an output of said third flip flop;
a second OR gate;
a fourth flip flop connected to receive an output of said second OR gate and triggered when said fourth control command is applied;
said second OR gate being connected to said line and to receive an output of said fourth flip flop;
said first to fourth flip flops being set when triggered and receiving a ONE signal; and
said output circuit being operable to energize or deenergize one of said addressed external output devices in response to the outputs of said first to fourth flip flops.

2. A programmable sequence controller according to claim 1, wherein said first AND gate is connected at the output terminal thereof to the input terminal of said first flip flop through an inverter and connected at the input terminal thereof to the reset output terminal of said first flip flop;
said second AND gate is connected at the output terminal thereof to the input terminal of said second flip flop through an inverter and connected at the input terminals thereof to said line through an inverter and to the reset output terminal of said second flip flop;
said first OR gate is connected at the output terminal thereof to the input terminal of said third flip flop and connected at the input terminal thereof to the set output terminal of said third flip flop; and
said second OR gate is connected at the output terminal thereof to the input terminal of said fourth flip flop and connected at the input terminals thereof to said line through an inverter and to the set output terminal of said fourth flip flop.

3. A programmable sequence controller according to claim 2 further comprising:
- a third AND gate connected at the input terminals thereof to the reset output terminals of said first and second flip flops; and
- a third OR gate connected at the input terminals thereof to the set output terminals of said third and fourth flip flops;
- said output circuit being operable to energize or deenergize one of said addressed external output devices in response to the outputs of said third AND and OR gates.

4. A programmable sequence controller according to claim 3 further comprising:
- a fifth flip flop operable to be set when one of said third and fourth control commands is applied;
- a fourth AND gate connected to the output terminals of said third AND and OR gates; and
- a fifth AND gate connected to the output terminal of said third AND gate and the reset output terminal of said fifth flip flop;
- said output circuit being operable to energize or deenergize one of said addressed external output devices in response to the outputs of said fourth and fifth AND gates.

5. A programmable sequence controller according to claim 4, wherein said first to fifth flip flops are D type flip flops.

6. A programmable sequence controller according to claim 3, wherein said command information is selected from a group of control commands including said first to fourth control commands, a first logic transfer command for examining whether an input is in an ON state under the condition of being ORed with another input and for transferring the examination result, and a second logic transfer command for examining whether an input is in an OFF state under the condition of being ORed with another input and for transferring the examination result; and wherein said logic operation circuit further comprises:
- a logic transfer circuit connected between said line and said first AND gate for applying to said first AND gate an output depending upon an output of said third OR gate when one of said first and second logic transfer commands is applied and for applying to said first AND gate an output depending upon a logical value appearing on said line when none of said first and second logic transfer commands is applied;
- first gate means for applying a trigger signal to said third flip flop at a predetermined time when said first logic transfer command is applied;
- second gate means for applying a trigger signal to said fourth flip flop at a predetermined time when said second logic transfer command is applied;
- third gate means for applying ZERO signals to said third and fourth flip flops after said predetermined time when one of said first and second logic transfer commands is applied; and
- fourth gate means for applying trigger signals to said first, third and fourth flip flops after said predetermined time when one of said first and second logic transfer commands is applied.

7. A programmable sequence controller according to claim 6, wherein said logic transfer circuit comprises:
- a fourth AND gate connected at the input terminals thereof to the output terminal of said third OR gate and to receive a signal responsive to one of said first and second logic transfer commands;
- a fifth AND gate connected at the input terminals thereof to said line and to receive through an inverter a signal responsive to one of said first and second logic transfer commands; and
- a fourth OR gate connected at the input terminals thereof to the output terminals of said fourth and fifth AND gates and at the output terminal thereof to the input terminal of said first AND gate.

* * * * *